April 15, 1947.  C. A. POSEY  2,418,985
PROPORTIONING DEVICE
Filed June 10, 1943
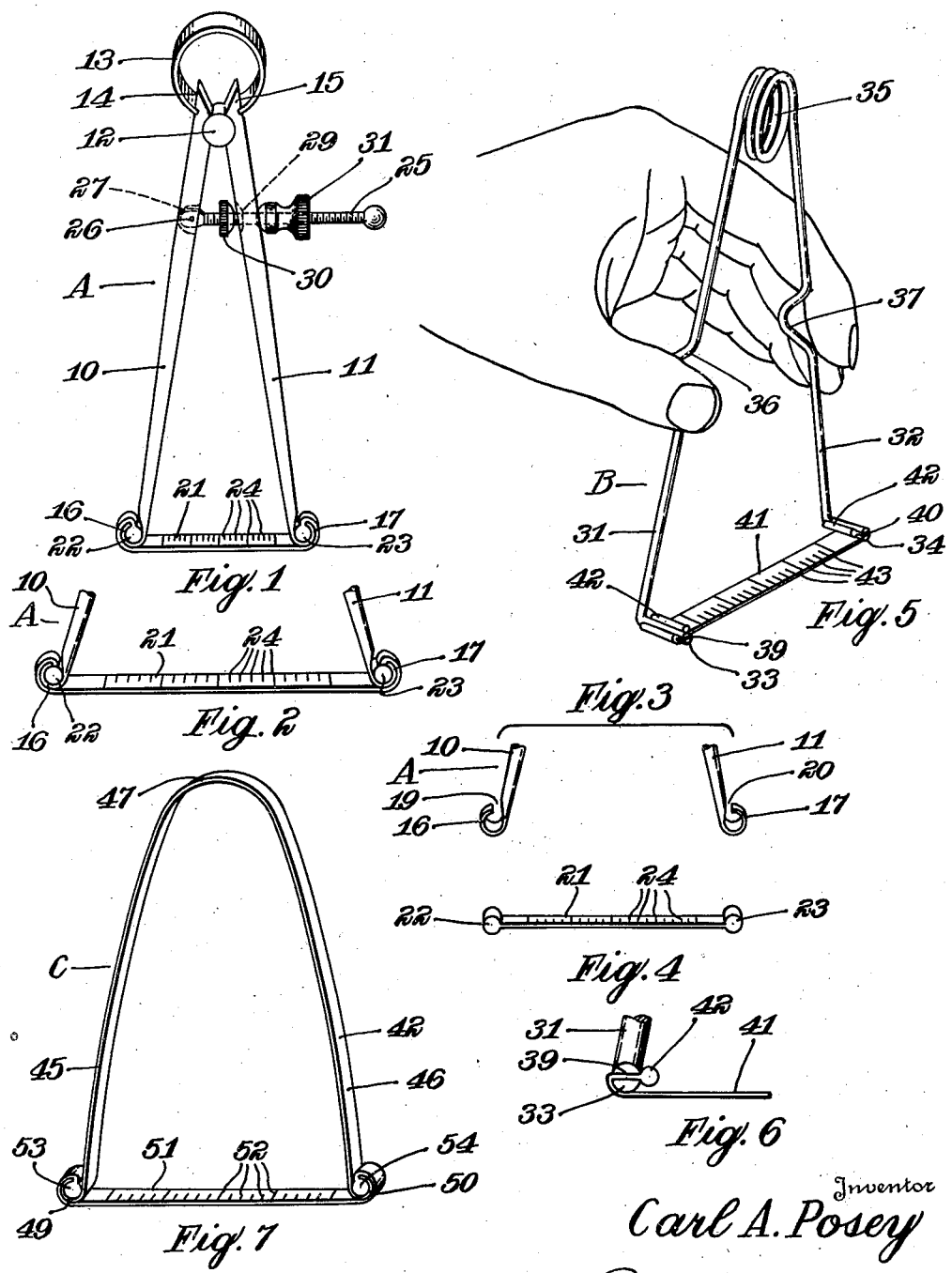
Inventor
Carl A. Posey
By Robert M. Dunning
Attorney Patented Apr. 15, 1947

2,418,985

UNITED STATES PATENT OFFICE 2,418,985

PROPORTIONING DEVICE

Carl A. Posey, St. Paul, Minn.

Application June 10, 1943, Serial No. 490,264

1 Claim. (Cl. 33—137)

My invention relates to an improvement in proportional divider, wherein it is desired to provide a device capable of dividing a given distance into a predetermined number of equal parts.

In the formation of contour maps it is common practice to form on the maps, contour lines of equal elevation. To obtain these lines, numerous points of known altitude are plotted on the map and the spaces between points of lower and higher altitudes are equally divided so that the contour lines may be plotted therethrough. In this work it is therefore necessary to divide lines of varying lengths into a predetermined number of equal sections. It is for this work and for any other work in which a line must be divided into segments of equal length that the present invention is particularly useful.

It is the object of the present invention to provide a resilient strip having marked thereupon a series of equally spaced gage marks. When tension on the resilient strip is relaxed the gage marks are relatively close together. When the resilient strip is stretched the gage marks are relatively far apart. In either instance, however, the gage marks are equally spaced so as to divide the length of the resilient strip into a series of sections of equal length.

It is an object of the present invention to mount a resilient strip having equally spaced gage marks thereupon in a holder which tends to stretch the strip beyond its normal length. This holder is so devised that the ends of the strip may be readily moved together so as to decrease the distance between the gage marks on the resilient strip.

A feature of the present invention lies in the mounting of a resilient strip having equally spaced gage marks thereupon in a spring holder having a pair of legs, one of which is attached to each end of the strip. By pressing the legs of the holder together the length of the resilient strip is decreased, thereby moving the gage marks closer together.

A further feature of the present invention lies in the mounting of the marked resilient strip between a pair of spring urged legs which tend to stretch the marked strip and in providing a means for limiting the distance between the legs. By this means a distance may be divided into any desired number of equally spaced divisions in a simple and accurate manner.

A further feature of the present invention lies in the provision of a means for limiting the movement of the legs together in combination with a means for limiting the separation of the legs supporting the marked strip. With such a combination a predetermined enlargement or reduction may be obtained. For example if lines or distances are to be reduced to three-fifths their original size, the limiting means is set so that the strip is three-fifths its maximum length when limited by the means limiting movement of the legs together. Accordingly, by measuring a distance on the scale or gage marks of the strip when the legs of the device are separated the maximum amount, a length of three-fifths the original length will be noted between these same gage marks when the legs are pivoted inwardly against the inner limiting means.

A further feature of the present invention lies in a novel and effective means for anchoring the resilient strip between the legs of the tool so that the strip may be replaced when it becomes damaged in any way, or when the strip becomes less resilient than when originally provided.

These and other objects and novel features of my invention will be more clearly and fully set forth in the following specification and claim.

In the drawings forming a part of my specification:

Figure 1 is a perspective view of a proportional divider.

Figure 2 is a perspective view of the roller end of the proportional divider illustrated in Figure 1 of the drawings, showing the legs of the divider spread to a greater extent than in Figure 1.

Figure 3 is a perspective view of the lower ends of the proportional divider legs with the resilient strip removed therefrom.

Figure 4 is a perspective view of a resilient strip which may be used in conjunction with the proportional dividers illustrated in Figures 1, 2, and 3.

Figure 5 is a perspective view of a modified form of proportional divider construction.

Figure 6 is a detail view showing the connection between one leg of the divider illustrated in Figure 5 and the resilient strip or tape.

Figure 7 illustrates another modified form of proportional divider construction.

The proportional divider A illustrated in Figures 1, 2, and 3 of the drawings comprises a pair of relatively rigid legs 10 and 11 which are pivotally connected at 12 and which are normally urged apart by a loop-shaped flat spring element 13. The spring element 13 engages the projecting ends 14 and 15 of the legs 10 and 11, respectively, above the pivot 12, normally urging these projecting ends 14 and 15 together and thereby urging the legs 10 and 11 apart.

As best illustrated in Figure 3 of the drawings, the lower extremities of the legs 10 and 11 are flattened and are bent into substantially cylindrical shape, forming a substantially cylindrical barrel 16 at the lower end of a leg 10, and forming a similar substantially cylindrical barrel 17 at the lower end of a leg 11. The flattened ends of the legs terminate before completing the entire circumference of the cylindrical barrel, thus providing a groove or space near the top of the barrel. This slot in the barrel 16 is identified by the numeral 19, while the similar slot in the barrel 17 is identified by the numeral 20.

A strip or tape 21 of elastic or resilient material such as rubber, or a substitute therefor, is provided with enlarged substantially cylindrically shaped ends 22 and 23 designed for accommodation in the barrels 16 and 17, respectively. When the strip 21 is attached between the legs 10 and 11 the enlarged ends 22 and 23 are engaged in their respective barrels 16 and 17, portions of the strip 21 extending through the slots 19 and 20 and curving over the exterior surface of the barrels 16 and 17 in the manner best illustrated in Figures 1 and 2 of the drawings. In this way the resilient strip extends over the exterior surface of the barrels 16 and 17, and the strip 21 is positioned closely adjacent the paper or other material on which distances are to be divided or proportioned.

The strip 21 is provided with a series of indicating or gage marks 24 which are preferably equally spaced so as to enable the operator of the instrument to divide a given distance into a predetermined number of equal spaces. These gage lines 24 are relatively close together when the legs 10 and 11 of the instrument are relatively close together, and are considerably farther apart when the legs 10 and 11 of the instrument are spread farther apart. By using a material which will expand and contract evenly, all of the spaces between the gage marks 24 are always equidistant, regardless of how far the legs 10 and 11 are spaced.

I provide a threaded arm 25 which is pivotally connected at 26 in a recess 27 formed in the leg 10. This arm 25 extends through an aperture 29 in the arm 11. A threaded adjusting nut 30 may be provided on the threaded arm 25 intermediate the legs 10 and 11, and a second adjusting nut 31 may be provided on the arm 25 externally of the leg 11. These nuts 30 and 31 may be set to provide a maximum and minimum separation between the legs 10 and 11.

Due to the fact that the spring 13 normally tends to urge the legs 10 and 11 apart, the leg 11 normally bears against an end of the adjusting nut 31 and the maximum separation of the legs is determined by the position of this nut 31. By adjusting this nut the length of the resilient strip 21 may be varied and any distance within the range of the instrument may be divided into any predetermined number of equal spaces. Therefore, for example, a distance of 2 5/16 inches may be readily divided into seven equal sections or any other predetermined number of equal sections within the range of the instrument. Accordingly, this device is extremely useful for purposes such as dividing distances on contour maps where the space between two points of known altitude must be equally divided in order to determine the proper positioning of the contour lines. The instrument is similarly useful for many other purposes.

In using the instrument for making a drawing proportionally larger or smaller than an original drawing, it is only necessary to set the nuts 30 and 31 so as to limit the pivotal movement of the legs 10 and 11. For example, if a sketch is to be drawn which is three-fifths the size of an original sketch, the outermost marks of the strip may be set so as to lie five inches apart when the leg 11 is in engagement with the nut 31 and so that these same gage marks are three inches apart when the leg 11 is pivoted inwardly into engagement with the nut 30. With the legs 10 and 11 spread apart the maximum distance, any distance on the original drawing may be measured and the number of gage marks between the points to be measured is noted. The legs 10 and 11 may then be sprung together until the leg 11 strikes the nut 30 and the same number of gage marks may be marked out on the reduced drawing, the distance measured out on the reduced drawing being three-fifths of the original distance on the original drawing.

The manner in which the resilient strips or tapes 21 may be replaced is believed obvious from the drawings. The enlarged ends 22 and 23 may be slidably engaged in the barrels 16 and 17, the strip 21 being curved to extend around the outer surface of these barrels.

In Figure 5 of the drawings, I disclose a proportional divider construction B, which is somewhat simpler in form from the instrument A. The divider B is formed of a length of spring wire or rod and includes a pair of legs 31 and 32 having right angularly extending end portions 33 and 34, respectively. The legs 31 and 32 are connected by a coil 35 formed of spring material of which the legs are constructed, this spring coil 35 tending to urge the legs 31 and 32 apart. Each of the legs 31 and 32 may be kinked as at 36 and 37 so as to facilitate grasping the instrument.

The ends 33 and 34 are slotted as indicated at 39 and 40 so as to engage the resilient strip 41 near the ends thereof. The ends of the strip 41 are preferably provided with an enlargement 42 of a size which can not pass through the grooves 39 and 40, this enlargement anchoring the strip 41 in position.

As best illustrated in Figure 6 of the drawings, the strip 41 extends beneath the laterally projecting ends 33 and 34 of the legs 31 and 32 and extend inwardly through the slots 39 and 40 so that the enlarged ends 42 of the strip 41 lie inwardly of the leg ends 33 and 34. The spring coil 35 is of sufficient strength to normally stretch the strip 41 to a considerable length. By urging the legs 31 and 32 together a distance may be divided into a predetermined number of equal sections. Gage marks 43 similar to the gage marks 24 are provided on the strip 41.

In Figure 7 of the drawings I disclose a modified form of proportioning device C, which is even simpler in form than the previously described constructions. This divider C comprises merely a strip 44 of spring material such as metal, plastic or other material, which is generally U-shaped in form. This strip is thus provided with spaced legs 45 and 46 connected by a curved end portion 47. The ends of the legs 45 and 46 are curved to provide substantially cylindrical barrels 49 and 50, substantially identical to the barrels 16 and 17 formed on the ends of the legs 10 and 11, as seen in Figure 3 of the drawings. A resilient or elastic strip 51 having gage marks 52 thereupon and having enlarged ends 53 and 54, substantially identical to the ends 22 and 23 of the strip 21 is engaged between the barrels 49 and 50 in the manner which has been described in connection with the proportional divider A.

The legs 45 and 46 of the divider C are normally spaced apart sufficiently to spread the strip 51 to a considerable length. By engaging the legs 45 and 46 and drawing these legs together the distance between the gage marks 52 may be accordingly decreased so that any distance may be divided into any number of equal sections within the range of the instrument.

In accordance with the patent statutes, I have described the principles of construction and operation of my proportional divider, and while I have endeavored to set forth the best embodiments thereof, I desire to have it understood that obvious changes may be made within the scope of the following claim without departing from the spirit of my invention.

I claim:

A proportional divider comprising a pair of arms connected together at one end, said arms having free ends movable toward or away from each other, a flat resiliently extensible band having gage marks thereupon extending between said free ends, enlarged ends on said band, transverse substantially cylindrical sockets at the ends of said arms for receiving the enlarged ends of said band, and slots in said sockets through which the band may extend.

CARL A. POSEY.

REFERENCES CITED

The following references are of record in the file of this patent:

UNITED STATES PATENTS

| Number | Name | Date |
|---|---|---|
| 120,621 | Chassaing | Nov. 7, 1871 |
| 300,804 | Schild | June 24, 1884 |
| 380,836 | Warfield | Apr. 10, 1888 |
| 1,350,511 | Miller | Aug. 24, 1920 |

FOREIGN PATENTS

| Number | Country | Date |
|---|---|---|
| 99,110 | Austrian | Jan. 26, 1925 |